United States Patent
Tate et al.

[19]

[11] Patent Number: 5,979,473
[45] Date of Patent: Nov. 9, 1999

[54] METHOD AND APPARATUS FOR WASHING FRUIT

[75] Inventors: Daniel A. Tate, Yucaipa; Bernard A. Mullinaux, Riverside, both of Calif.

[73] Assignee: FMC Corporation, Chicago, Ill.

[21] Appl. No.: 08/633,326

[22] Filed: Apr. 17, 1996

Related U.S. Application Data

[63] Continuation of application No. 08/237,750, May 4, 1994, abandoned.

[51] Int. Cl.[6] ....................................................... B08B 3/02
[52] U.S. Cl. ........................... 134/66; 134/153; 134/157; 134/159; 15/3.14; 15/3.19
[58] Field of Search ..................... 15/3.14, 3.19; 134/153, 157, 64 R, 122 R, 159, 199, 66

[56] References Cited

U.S. PATENT DOCUMENTS

| | | | |
|---|---|---|---|
| 1,157,017 | 10/1915 | Lowe | 134/157 X |
| 1,609,474 | 12/1926 | Jacobson | 134/122 R |
| 1,633,437 | 6/1927 | Daniels | 134/153 X |
| 1,763,883 | 6/1930 | Colvin et al. | 15/3.19 X |
| 1,946,022 | 2/1934 | Jones . | |
| 2,219,809 | 10/1940 | Davis | 134/153 X |
| 2,378,418 | 6/1945 | Lister | 15/3.12 |
| 3,066,784 | 12/1962 | Remington et al. | 198/495 X |
| 3,155,102 | 11/1964 | Niederer, Jr. et al. | 198/495 X |
| 4,497,180 | 2/1985 | Graham | 134/122 R X |
| 4,584,147 | 4/1986 | Stehning | 239/DIG. 19 |
| 4,607,590 | 8/1986 | Pender | 134/64 R X |
| 5,483,871 | 1/1996 | Kirk et al. | 15/3.14 |

FOREIGN PATENT DOCUMENTS

| | | | |
|---|---|---|---|
| 907963 | 4/1954 | Germany | 134/64 |
| 59-196080 | 11/1984 | Japan | 15/3.1 |
| 1457890 | 2/1989 | Russian Federation | 15/3.1 |

*Primary Examiner*—Frankie L. Stinson
*Attorney, Agent, or Firm*—Ronald C. Kamp

[57] ABSTRACT

An improved apparatus for washing fruit that includes supporting rollers, a nozzle for directing a spray of water at 100 psi at the surface of the whole fruit; and clean-out bars that reduce the movement of the fruit toward the nozzle being transported at a predetermined time.

3 Claims, 3 Drawing Sheets

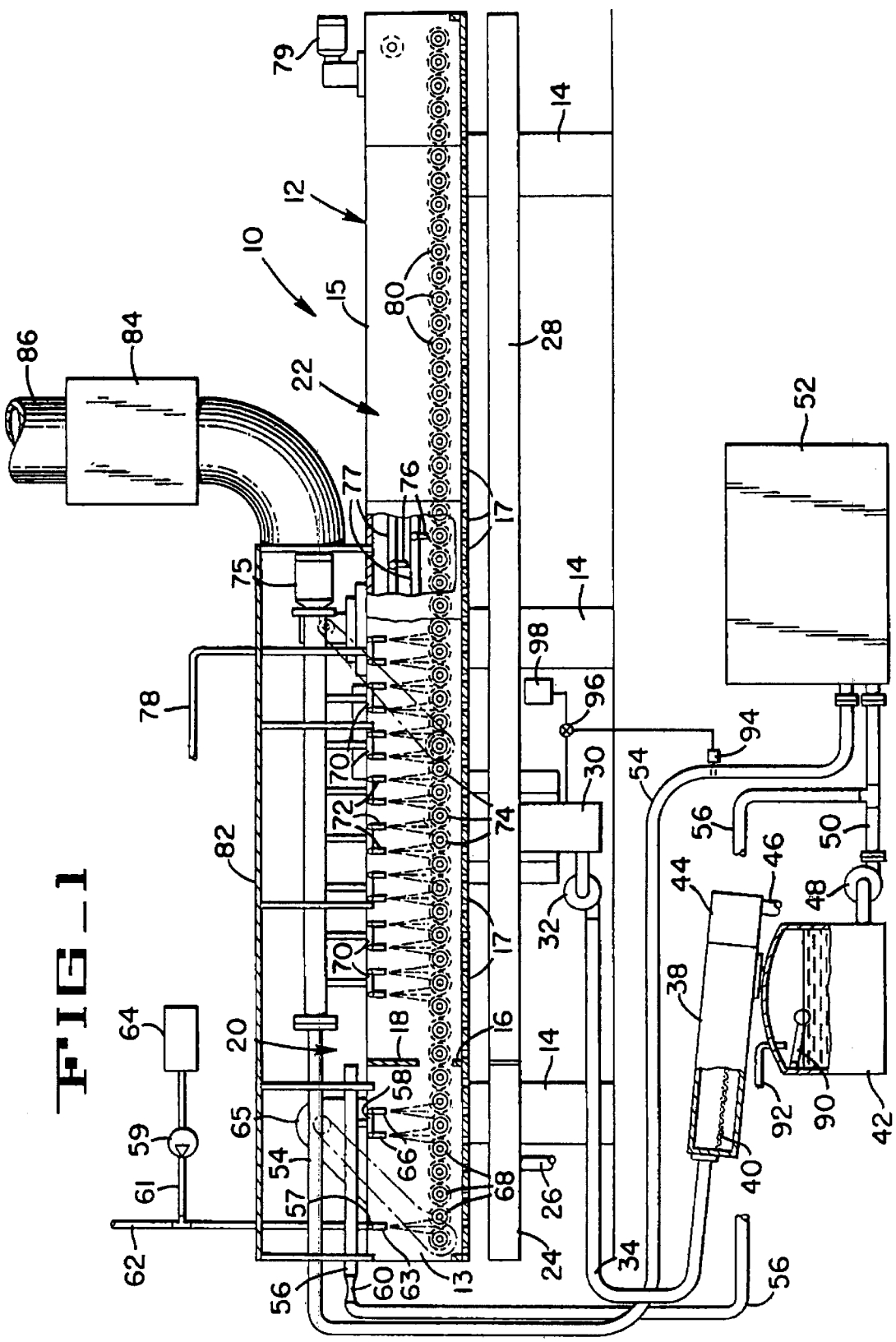

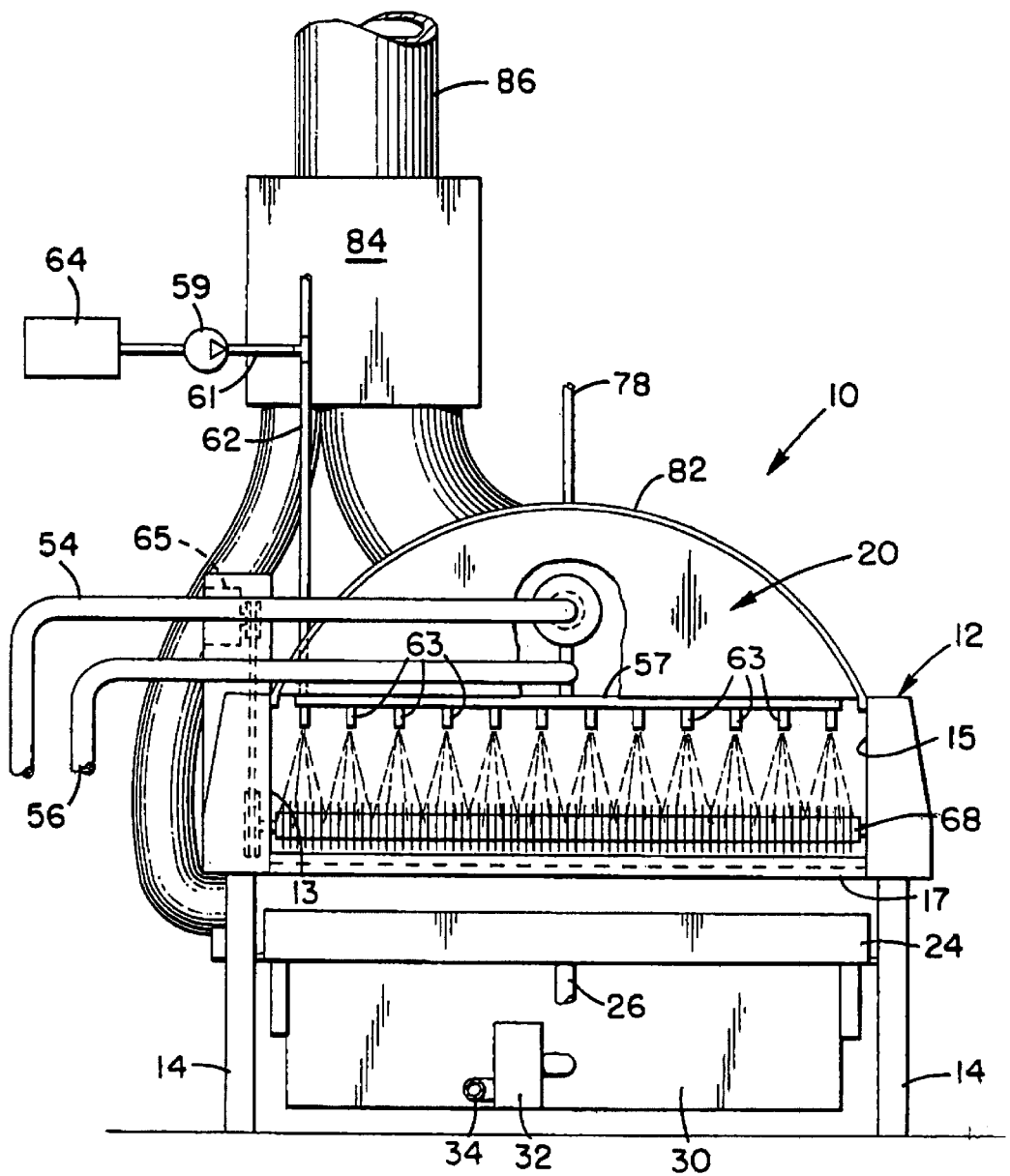
FIG_2

FIG_3
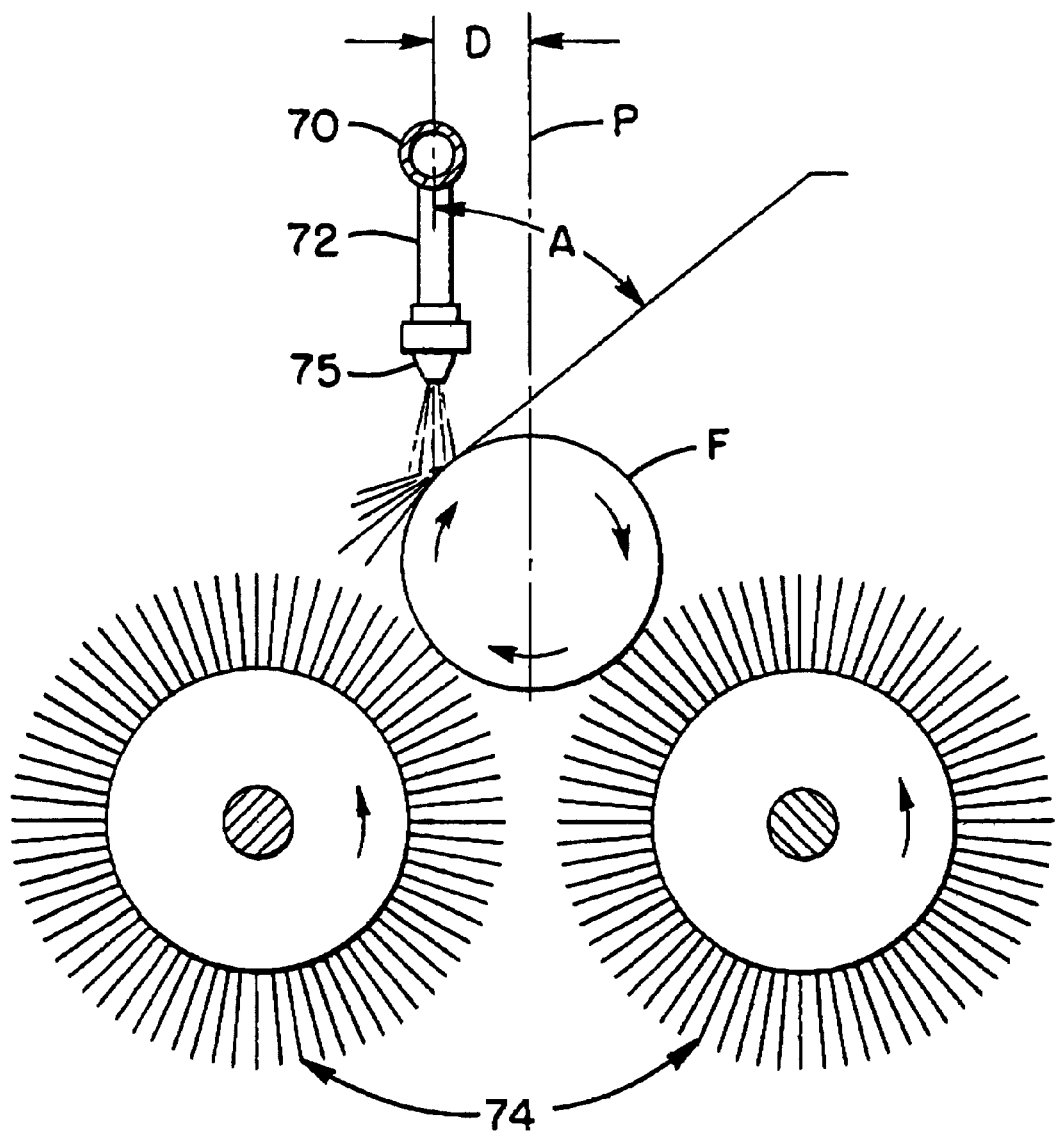

METHOD AND APPARATUS FOR WASHING FRUIT

This application is a continuation of application Ser. No. 8/237,750, filed May 4, 1994 now abandoned.

This invention relates to a improved method of and apparatus for washing fruits and vegetables, and more particularly to such a method and apparatus which is capable of removing red scale, mold and the like from the outer skin or peel of oranges, lemons and other citrus fruit as well as other fruit, such as apples, and vegetables, such as potatoes. While this invention has application to nearly all fruit and to some vegetables, the preferred embodiment described herein is the application of the invention to citrus fruit.

Fruit sold for its juice has a much lower value than the same fruit sold as whole, fresh fruit. The appearance of the outer surface of the fruit is one of the prime factors in determining whether it is marketable as whole fruit. Blemishes, e.g. cuts and bruises, and what appear to be blemishes, e.g. unsightly organisms such as red citrus scale, algae, mold and the like, on the outer surface relegate such fruit to be used for juice, even though such organisms on the peel of citrus fruit, for example, do not adversely affect the quality of the underlying fruit. Thus, removing such organisms without damaging the peel will increase the value of the fruit.

The present invention comprises a method of and apparatus for washing fruit, particularly citrus fruit, which removes debris including scale, mold, algae and other organisms, from the peel, which does no significant damage to unbroken peel; which increases the percentage of such fruit that can be marketed as whole, fresh fruit; which conserves water; which is adjustable to compensate for variations in the fruit crop's condition, such as the level of infestation by such organisms; and which is relatively easy to install, operate and maintain.

These and other attributes of the present invention, and many of the attendant advantages thereof, will become more readily apparent from a perusal of the following description and the accompanying drawings, wherein:

FIG. 1 is a side elevational view, with portions broken away for clarity, of an apparatus according to the present invention;

FIG. 2 is an elevational view of a portion of the apparatus shown in FIG. 1 looking from the left side thereof; and FIG. 3 is a detailed view of the high pressure nozzle incorporated into the apparatus of FIGS. 1 and 2.

Referring to FIGS. 1 and 2, there is shown a high pressure washer for citrus fruit, indicated generally at 10, having a U-shaped frame 12 supported on piers 14. The U-shaped frame 12 is defined by side plates 13 and 15 and a plurality of angle iron members extending between and secured to the lower edges of the plates 13 and 15. The members 17 are spaced apart to form slots through which water may freely drain. The frame 12 is open at each end and divided by a rigid cross member 16 and a flexible barrier 18 into a front section 20 and a rear section 22. The fruit, which is fed from the left, as viewed in FIG. 1, is washed with a soap solution and rinsed at low pressure to remove dirt, leaves and other debris in the front section 20 and, in the rear section, is washed at high pressure to remove the aforementioned organisms, rinsed with potable water and then dried. A collection pan 24 is positioned under the front section 20 to collect the dirty, soapy water. The dirty water collected by the collection pan 24 is discarded through a drain line 26 connected thereto. A collection pan 28 accepts the water from the rear section 22 and directs it to a sump 30. A centrifugal pump 32 is connected to draw the water from the sump 30 and discharge it at low pressure in the range of 5 to 10 psi into conduit 34, which discharges into a filter 38. A screen 40 having a mesh of 40 to 150 is secured within the filter 38 and is angled downward from horizontal from 5 to 12 degrees. Water passes through the screen 40 and into a reservoir 42 while the organic material remains on the upper surface of the screen 40 and is washed down to a collection bin 44 at the lower end of the filter 38. A drain 46 connects with the bin 44 and permits emptying of the bin for disposal of the organic material collected therein.

A centrifugal pump 48 draws water recovered in the reservoir 42 and discharges it through conduit 50 to a high pressure pump room 52, which preferably is encased in acoustic material to dampened the noise generated by the positive displacement pumps therein. Alternatively, the expense of the pump room can be avoided, when circumstances permit, by locating the positive displacement pumps at a remote location outside of the building housing the washer 10. The conduit 50 supplies the positive displacement pumps, which may be from one to four in number and capable of supplying a combined volume of 50 to 500 gallons of water per minute at a pressure of 100 to 850 psi. The number of positive displacement pumps is determined by the capacity of the system and the difficulty of removing the organisms on the fruit peel. A conduit 56 is connected to the conduit 50 and is connected with supply tube 58 extending across the frame 12. An orifice 60 is interposed in the conduit 56 to reduce the pressure in the tubes 58 to the low pressure of 5 to 10 psi. Upstream of the tubes 58 is a single supply tube 57 which connects with a fresh water supply line 62. Liquid soap held in container 64 is metered into the line 62 by injector pump 59 through line 61 and mixed with the fresh water for applying the soap solution to the fruit as it first enters the washer 10. The soap solution is applied to the fruit though nozzles capable of producing a conical pattern affixed to the end of tubes 63 attached to and spaced along the cross tube 57. The fruit are then scrubbed while covered with soap solution by a plurality of notched brush rollers 68 before being rinsed by spraying recirculated water through a plurality of vertical tubes 66 spaced along each of the cross tubes 58. The lower end of each vertical tube 66 is also provided with an orifice capable of producing a conical pattern. The vertical tubes 66, as well as the tubes 63, are spaced apart on their respective cross tubes so that the spray patterns of the nozzles on each cross tube just meet each other adjacent the brush rollers and thereby achieve complete coverage across the width of the frame 12. The vertical tubes 63 and 66 are positioned above and centered between the underlying driven rollers 68. The rollers 68 are driven in a clockwise direction, as viewed in FIG. 1, in a conventional manner by chains trained over sprockets by an electric motor 65. The last roller in the front section 20 of the frame 12 is a smooth PVC plastic roller, which preferably is rotated at a higher rotational speed to remove as much of the soapy water as possible, for collection by the collection pan 24, before the fruit enter the high pressure wash section 22.

The water under high pressure from the positive displacement pumps is discharged into conduit 54, which connects with cross tubes 70 extending across the frame 12. A plurality of vertical tubes 72 connect with and are spaced along the length of each cross tube 70. The lower end of each vertical tube is provided with an orifice which produces a fan-shaped spray pattern, with the greater dimension of the fan extending parallel with the cross tubes 70. As shown in FIG. 3, the fruit are supported on straight brush rollers 74, which are driven by an electric motor 75 in a conventional manner similar to the rollers 68. The vertical tubes 72 are positioned to be parallel to and spaced a distance D downstream of a vertical plane, indicated by the line P, equidistant from the center of rotation of the rollers 74. The distance D is less than the radius of the smallest fruit being washed so that the entire spray impinges the surface of the fruit when supported by the two rollers 74. In this position the high pressure spray from the nozzle 75 impinges on the fruit, indicated at F, at an angle A, which minimizes damage to the peel while effectively removing any red scale, mold, algae or other such organism growing on the peel as a result of the kinetic energy of the high pressure spray. The rollers 74 continuously rotate the fruit F while it is under the nozzle 75 so that the entire surface of the fruit is exposed to the spray. The rotational speed of the rollers in the rear section 22 is slower than the rotational speed of the brush rollers in the front section so that each incremental area of an individual fruit F is exposed to the fan spray for a longer period of time. However, the residence time, i.e. the total time the fruit F remains under the spray, is determined by clean-out bars 76 which are supported in tracks 77 attached to the side plates 13 and 15 of the frame 12. These bars are positioned to engage the fruit and urge the fruit toward the right, as viewed in FIG. 1. The number of bars and the speed at which they are moved determines the residence time. The clean-out bars are moved by a chain trained over sprockets in a continuous loop and powered by an electric motor 79. By varying the speed of the motor 79, the aforementioned residence time can be increased and decreased. The bars 76 also function to protect the vertical tubes 72 and nozzles 75 from being damaged by preventing the build of fruit, i.e. the piling of fruit on top of each other. Because the recirculated water has not been perfectly filtered and is thus abrasive, the nozzles 75 producing the fan-shaped pattern are of the ceramic faced type used in agricultural sprayers, such as sold by Céramiques Techniques Des Marquest of Evreux, France, for example. The last row or two of nozzles in the rear section 22, which produce a conical pattern, are supplied with fresh, potable water from water line 78. The rollers 80 following the brush rollers 74 are sponge rollers which function to dry the fruit for further processing.

The front section 20 removes heavy debris from the fruit. The water used in this section, most of which is itself recovered water, contains soap and heavy debris, which is the most difficult to properly filter, is separately collected and discarded. It is this separation which makes filtration of the water used in the rear section practical. Since water used in the front section is discarded, make up water is required. The proper amount of make up water is determined by a float valve 90 in the reservoir 42 which maintains a predetermined water level therein by admitting water through fresh water line 92 as the level drops. Maintaining proper chlorine concentration in the recovered water is important to prevent growth of algae. This is achieved by metering chlorine in the sump 30 as a function of the flow of recovered water through the conduit 54. A flow sensor 94 senses the flow in conduit 54 and controls a valve 96 permitting chlorine in container 98 to be introduced to the water in sump 30. Alternatively, it is possible to monitor the speed of the high pressure pumps and derive the flow in conduit 54. In order to control humidity within the building housing the high pressure washer, a cover 82 is arched over that portion of the frame 12 containing spray nozzles with an exhaust fan 84 drawing air from under the cover and discharging it though exhaust duct 86.

While a preferred embodiment of the present invention has been illustrated and described herein, it will be appreciated that various changes may be made therein without departing from the spirit of the invention as defined by the scope of the appended claims.

What is claimed is:

1. Improved apparatus for washing scale, mold, algae, or other such organisms from fruit having a generally spherical shape to improve marketability as whole fruit, comprising:

a pair of rollers for supporting individual fruit;

means for driving said rollers in the same direction of rotation to cause the individual fruit to rotate;

a nozzle for directing a fan-shaped spray of water under pressure of at least 100 psi at the fruit at an angle to the surface of the individual fruit; and transport means independent of said driving means for moving individual fruit from under said spray nozzle after a predetermined time, said transport means including a plurality of clean-out bars which bars maintain their orientation in order to reduce the movement of fruit upward toward said nozzle.

2. The improved apparatus according to claim 1 wherein said rollers are spaced apart to define a vertical plane therebetween and said nozzle is offset from said plane so that the force of the spray from said nozzle tends to oppose the rotation imposed by said rollers on the individual fruit.

3. The improved apparatus according to claim 1 wherein said nozzle is ceramic faced.

\* \* \* \* \*